Sept. 29, 1959     C. S. CLAY, JR     2,906,363
MULTIPLE TRANSDUCER ARRAY
Filed May 6, 1955     5 Sheets-Sheet 1

Clarence S. Clay Jr.    Inventor

By Richard S. Nagel Attorney

Sept. 29, 1959   C. S. CLAY, JR   2,906,363
MULTIPLE TRANSDUCER ARRAY
Filed May 6, 1955   5 Sheets-Sheet 2

Clarence S. Clay Jr. Inventor

By Richard H. Nagel Attorney

Sept. 29, 1959   C. S. CLAY, JR   2,906,363
MULTIPLE TRANSDUCER ARRAY
Filed May 6, 1955   5 Sheets-Sheet 3

Clarence S. Clay Jr.   Inventor
By Richard H. May   Attorney

Sept. 29, 1959  C. S. CLAY, JR  2,906,363
MULTIPLE TRANSDUCER ARRAY
Filed May 6, 1955  5 Sheets-Sheet 4

Clarence S. Clay, Jr.  Inventor

By Richard H. Nagel Attorney

Sept. 29, 1959      C. S. CLAY, JR      2,906,363
MULTIPLE TRANSDUCER ARRAY

Filed May 6, 1955      5 Sheets-Sheet 5

Clarence S. Clay, Jr.     Inventor

By Richard H. Nagel Attorney

United States Patent Office 2,906,363
Patented Sept. 29, 1959

2,906,363

MULTIPLE TRANSDUCER ARRAY

Clarence S. Clay, Jr., Tulsa, Okla., assignor, by mesne assignments, to Jersey Production Research Company Application May 6, 1955, Serial No. 506,615

4 Claims. (Cl. 181—.5)

This invention concerns improvements in the transmitting and receiving of waveform signals, especially with respect to improving the directivity of an array of transducers. The invention is of particular utility in the are of seismic prospecting, having application to the use of a pattern of geophones or of shot holes that will furnish a broad band of reduction or rejection of horizontally traveling seismic interferences.

In the art of seismic prospecting, a seismic disturbance is initiated at a selected point in or on the earth's surface, as for example by detonating an explosive charge in a shot hole, and the resulting waves which travel down to the underlying strata and are reflected upward are detected by geophones at a number of points spread out in a selected pattern on the earth's surface. By determining the arrival time of the waves at the various detection points and knowing the seismic wave velocities in the various earth layers, it is possible to estimate the depths of the several reflecting substrata.

Although it is theoretically possible to time the arrival of a reflected seismic wave by the use of a single geophone and recording device, in practice it is usually difficult and sometimes impossible to pick out indicated reflection waves from a number of other earth vibrations that are detected and recorded at the same time. Therefore the usual practice is to employ a plurality of seismometers spread over a considerable distance along the earth's surface in a selected pattern as just described and to make a plurality of traces in side-by-side relation on a single chart for purposes of comparison, since a reflection from a well-defined stratum will appear on the record as a wave form of increased amplitude on all of the traces in some definite time relation, thus permitting the reflection to be "lined up" on the record.

It has been found that when difficulty is encountered in obtaining suitable reflections on the record in some prospecting areas significant improvements in the ratio of reflection to non-reflection energy or, in other words, in the ratio of essentially vertical-traveling reflection energy to essentially horizontal-traveling interference energy can often be obtained by using a plurality of geophones at each detection station connected so that their outputs add together, the combined signal being recorded as a single trace on the record. This serves to average out some of the complex earth motions associated with the seismic disturbance and thus give a simpler record. Nevertheless, such use of multiple geophones has left much to be desired.

It is an object of the present invention to provide an arrangement of geophones wherein the geophones are so spaced that the response of the array to horizontally traveling transients will be substantially less than that obtained with a conventional array of evenly spaced geophones, thus still further improving the ratio of essentially vertically traveling reflection energy to essentially horizontally traveling interfering energy.

In accordance with the present invention an array of geophones is used comprising a plurality of sets of uniformly spaced geophones with non-uniform spacing between the sets so that with the overall array the null wave length characteristics of the sets will be incommensurable with each other.

Alternatively or in conjunction with such an array of geophones a desired directivity of seismic waves can be obtained by utilizing an array of seismic shot holes spaced in accordance with the principles of this invention.

In a broader aspect of the invention the same principles that apply to the design of such geophone arrays are applicable to arrays of other transducers such as microphones, acoustic generators and pickups, loud speakers, electromagnetic wave antennas and the like.

The nature and objectives of the invention are more clearly understood when reference is made to the accompanying drawings in which.

Figure 5:
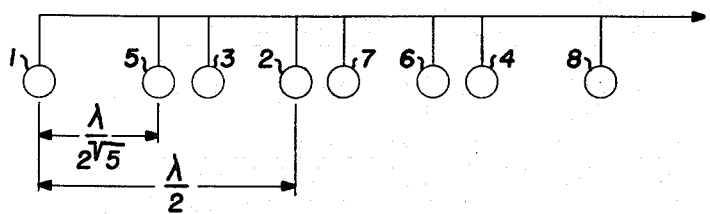
Figure 5 is a schematic plan view of an embodiment of the invention utilizing eight geophones in the array.
Figure 12:
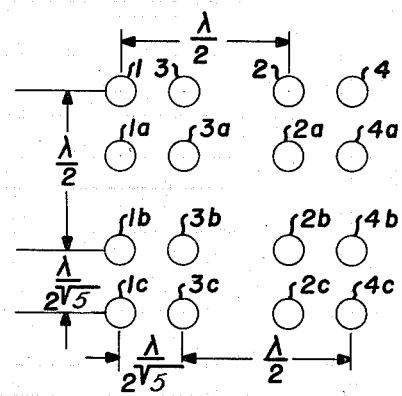
Figure 13:
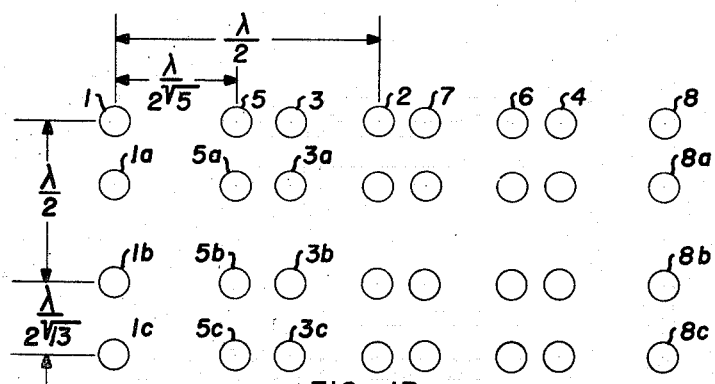
Figure 8:
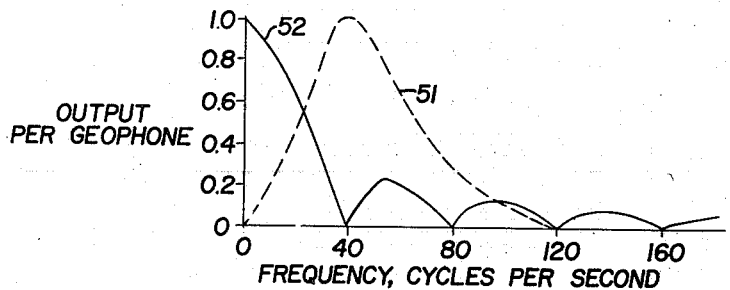
Figure 9:
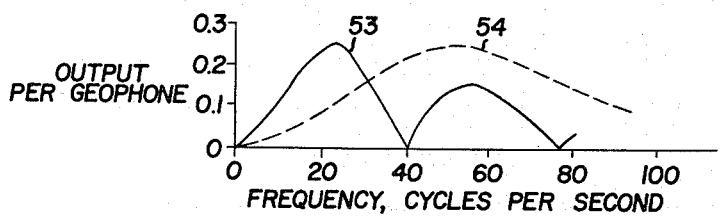
Figure 10:
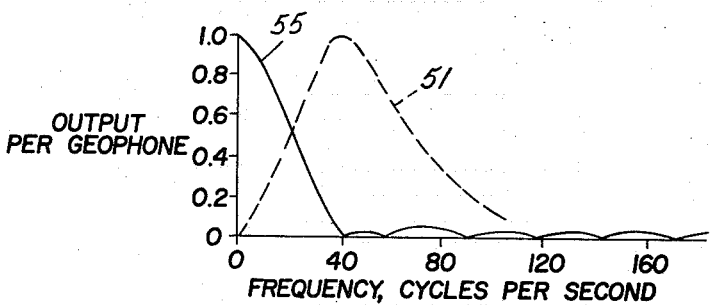
Figure 11:
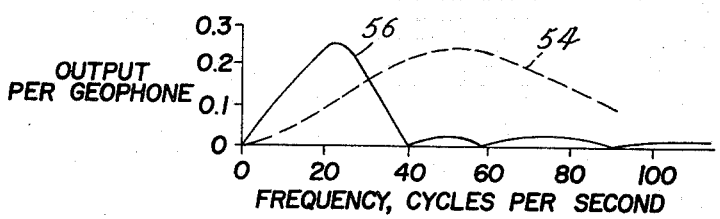
Figure 14:
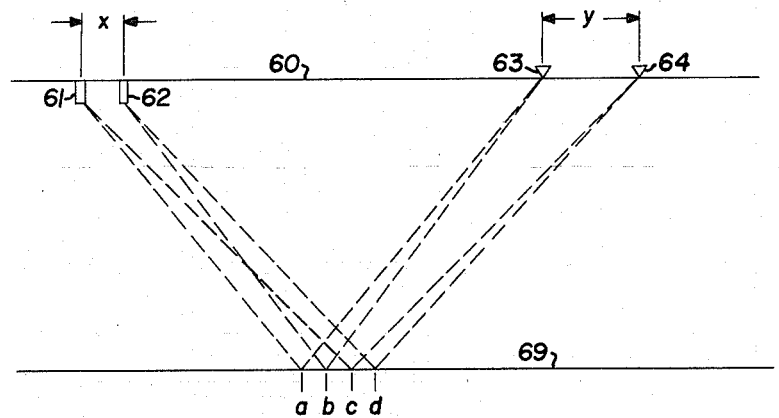
Figure 15:
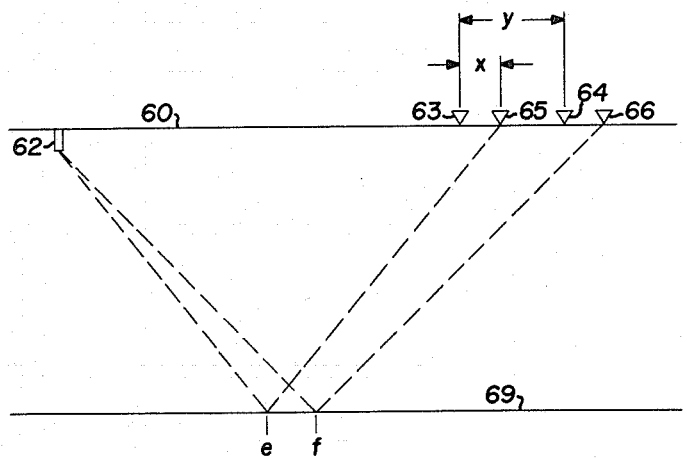

Figures 8 and 9 constitute a graphical analysis of the response characteristics of a geophone array employing evenly spaced geophones;

Figures 10 and 11 constitute a graphical analysis of the response characteristics of an array utilizing sixteen geophones spaced in accordance with the present invention;

Figure 12 is a schematic plan view of a square areal array of transducers using the spacing pattern of Figure 5 in each of two perpendicular directions;

Figure 13 is a similar schematic plan view of a rectangular array of transducers;

Figure 14 is a schematic elevational view showing a seismic prospecting arrangement in which a plurality of shot points and a plurality of geophones are used, with the spacing between shot points being incommensurable with the spacing between geophones; and Figure 15 is a similar elevational view showing the equivalence of the arrangement of Figure 14 to one using an incommensurable null spacing of geophones.

Figure 1:
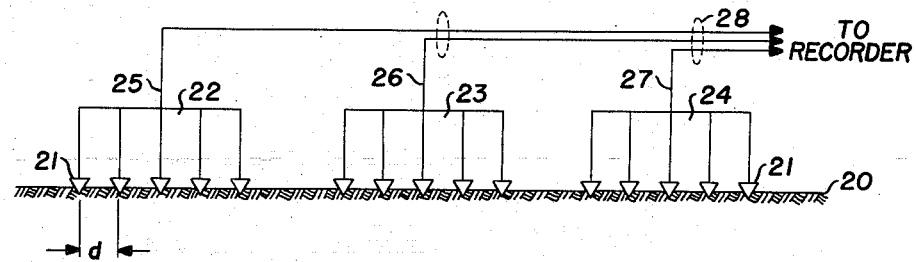
Figure 1 is a schematic diagram of a portion of a conventional multiple geophone spread.

In Figure 1 a portion of a conventional multiple geophone spread is shown. Usually at least twelve channels will be used in the spread but only three geophone channels are represented in the figure. The geophones 21 are placed upon or embedded in the surface of the ground 20 with the separate geophone groups 22, 23, and 24 each positioned at a desired detection station along the profile being prospected. The geophones in each group are evenly separated by a distance $d$. Suitable connection is made between each of the geophone groups 22, 23, and 24 and separate recording channels in the seismic recording apparatus by means of separate conductors 25, 26, and 27 in a cable 28.

In accordance with the present invention, as already stated, the geophones in the array are not spaced evenly. To determine the geophone spacing, consideration is given to the longest wave length of horizontally traveling interfering energy that is to be suppressed. This wave-length is given the designation λ. The length of each unit of the array is then determined by the relationship $$\frac{\lambda(n-1)}{n}$$

where $n$ is the number of geophones in the set. Thus if each set consists of two geophones the unit extends over ½ wave length. If three geophones are used in each set the set will extend over ⅔ of a wave length and the geophones will be spaced ⅓ of a wave length apart. In the same manner with four geophones per unit the set would be ¾λ in length. The spacing between sets is then selected to be incommensurable with the spacing between geophones within the sets. Conveniently the spacing between sets can differ from the spacing between geophones by a function of a small prime number, for example the half power of 2, 3, 5, 7, 11, or 13 and so on.

The technique for determining the wave lengths of interfering energy from conventional seismograms is well known to those skilled in the art of seismic prospecting and need not be elaborated upon here.

Figure 2:
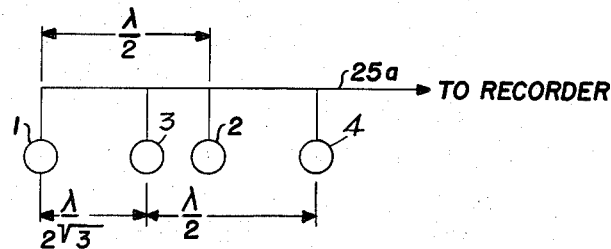
Figure 2 is a schematic plan view of the simplest embodiment of a geophone array in accordance with the present invention utilizing four geophones with two geophones in each set.

In Figure 2 an array of four geophones is shown, all connected to the same conductor 25a. Geophones 1 and 2 are ½ wave length apart, geophones 3 and 4 are also ½ wave length apart, and geophones 1 and 3 are separated by the distance $$\frac{\lambda}{2\sqrt{3}}$$

Alternatively the distance between geophones 1 and 2 could be $$\frac{\lambda}{2\sqrt{2}}$$

Figure 3:
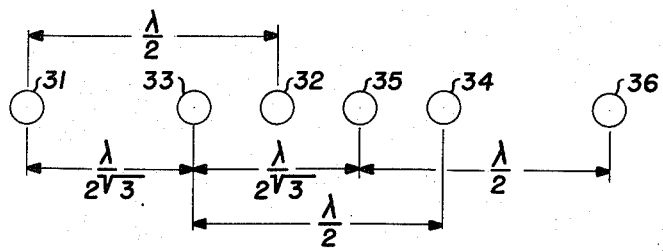
Figure 3 is a schematic plan view showing an array utilizing two geophones in each of three sets.

Another six-geophone array is depicted in Figure 3. In this array three sets of geophones are used, the spacing between the geophones in each set and the spacings be-between the geophones in each set and the spacing be-spacing between geophones 31 and 32, between geophones 33 and 34, and between geophones 35 and 36 is in each instance ½ wave length, while geophones 31, 33 and 35 are spaced from each other by $$\frac{1}{2\sqrt{3}}$$

times the wave length. As in Figure 2, all six geophones are connected to the same conductor to feed a single trace on the recorder, but the connections are not shown.

Figure 4:
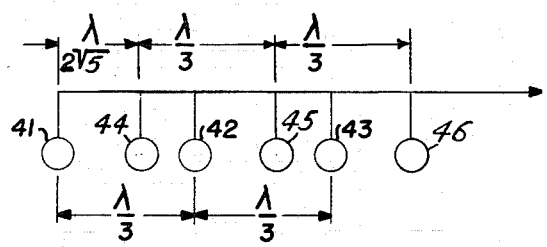
Figure 4 is a schematic plan view of an array utilizing three geophones in each of two sets.

In Figure 4 is shown a similar array using three geophones in each set. Geophones 41, 42, and 43 are separated from each other by ⅓ wave length and geophones 44, 45, and 46 are similarly separated from each other by ⅓ wave length. The initial geophones of the two sets, i.e., geophones 41 and 44, are separated from each other by the distance $$\frac{\lambda}{2\sqrt{5}}$$

In Figure 5 is shown a schematic plan view of a geophone array utilizing eight geophones which consists of two of the units of Figure 2 with the first geophone 5 of the second unit being separated from the first geophone 1 of the first unit by the distance $$\frac{\lambda}{2\sqrt{5}}$$

Figure 6:
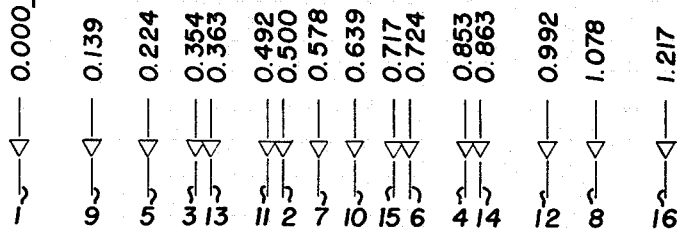
Figure 6 is a schematic plan view showing an array in which a total of sixteen geophones is used.
Figure 7:
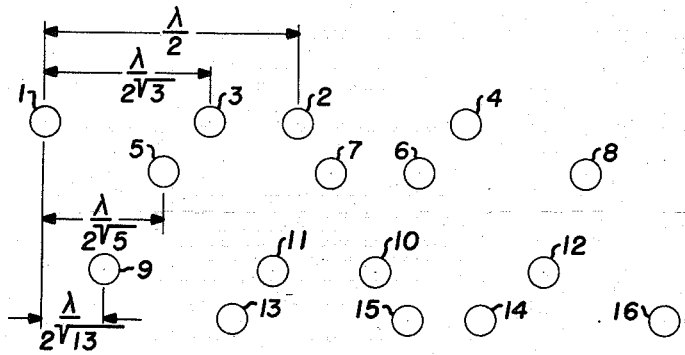
Figure 7 is an exploded presentation of the diagram of Figure 6 showing the development of the geophone spacing.

In a similar manner the sixteen-geophone array of Figure 6, as will be seen from the exploded view of Figure 7, consists of the eight-geophone array of Figure 5 repeated with the first geophone 9 of the second group of eight spaced from the first geophone 1 of the first group of eight by the distance $$\frac{\lambda}{2\sqrt{13}}$$

The separation between geophones in the sixteen-geophone array is expressed in decimal fractions of a wave length in Figure 6. As in the previous arrays all of the geophones are connected to a single conductor leading to the recorder although the connections are not shown here.

Referring now to Figures 8 to 11 inclusive the response characteristics of a geophone array employing sixteen evenly spaced geophones and the response characteristics of an array utilizing sixteen geophones spaced as in Figure 6 are graphically analyzed and compared.

In Figure 8 is presented a graphical representation of the assumed amplitude versus frequency spectrum of an interfering transient signal identified by line 51 and the amplitude versus frequency response curve, identified by line 52 of an array of sixteen evenly spaced geophones. It will be noted that the geophone array has response nulls at 40, 80, 120 and 160 cycles per second.

Curve 52 shows the response of geophone array to a continuous wave of each particular frequency over the range of 0 to about 160 cycles per second. Since the purpose of curve 52 is to compare magnitudes the relative phase of the output is ignored and all portions of the curve are shown as positive magnitudes.

The analysis used in constructing Figure 8 is based on an analogy to the response curve of an electrical filter and hence curve 51 can be treated as the assumed spectrum of a transient signal that is to be "filtered out." It is more convenient to handle the analysis on the basis of frequencies rather than wave lengths although it is to be remembered that it is the wave lengths of the interfering waves that are of principal concern. It is merely necessary to assume uniform velocities of wave propagation to handle the analysis on a frequency basis.

By determining the product of the geophone array response curve 52 and the amplitude of the transient 51 at each frequency, the curve 53 in Figure 9 is obtained. For comparison line 54 is presented showing the amplitude versus frequency for a desired reflection having a frequency of 50 cycles. It will be noted from curve 53 that the interfering signal has an appreciable amplitude at the 50 cycle frequency.

In Figure 10 is presented an amplitude versus frequency curve 55 for the geophone array of Figure 5. The amplitude versus frequency curve for the interfering signal is again represented by line 51. Deriving Figure 11 from Figure 10 in the same manner that Figure 9 was derived from Figure 8, it will be seen that the amplitude versus frequency curve 56 is much improved over the curve 53 of Figure 9 and that the amplitude of the interfering signal is greatly reduced in the 50 cycle range.

The same principles of spacing as are illustrated in Figures 2 through 7 can also be employed for areal arrays. For example a square areal pattern can be used as shown in Figure 12 in which the spacing pattern of Figure 5 is used for the separation of the geophones in each row as well as for the spacing between the rows. Thus geophones 1 and 1b are spaced from each other the same distance as geophones 1 and 2, geophones 1a and 1c are spaced from each other the same distance as geophones 3 and 4 and geophones 1 and 1a are spaced from each other the same distance as geophones 1 and 3.

Similarly Figure 13 shows a rectangular areal pattern in which the geophones 1 through 8 are spaced from each other in the same manner as in Figure 5 and the rows containing the geophones 1a through 8a, 1b through 8b, and 1c through 8c are spaced from the first row in the same ratio as geophones 1 and 9 in Figure 6.

A rectangular array of the type shown in Figure 13 is also useful for other types of transducers such as loud speakers, other acoustic generators, acoustic detectors, and electromagnetic wave antennas, when it is desired to produce a narrow beam of selected directivity. A directional array of this type would have considerable advantage over arrays that depend upon operating the different transducers at different levels in order to obtain the desired directivity. In an array spaced in accordance with Figure 13 or in accordance with similar patterns using the incommensurable null principle, all of the transducers can be identical and can be driven in the same phase and at the same operating level, thus greatly simplifying the setting up of such an array.

Still another modification of the invention is illustrated in Figure 14 wherein two or more shot holes 61 and 62 are spaced from each other on the earth's surface 60 a selected distance $x$ and two or more geophones 65 and 66 are separated from each other a distance $y$ which is incommensurable with the distance $x$, the charges in the two shot holes being detonated simultaneously and the outputs of the geophones 65 and 66 being combined.

Comparison of the diagrams of Figures 14 and 15 will readily reveal that the arrangement of Figure 14 is equivalent to an arrangement wherein only one shot hole 62 is used and four geophones are employed in the manner of Figure 2, geophones 65 and 66 being spaced apart the same distance $y$ as for the spacing of geophones 63 and 64, and geophones 63 and 65 being spaced the distance $x$ from each other. Considering the ray paths from each of the shot holes to a reflecting layer 69 and from there to each of the geophones it will be seen that the paths, and therefore the travel times of the waves, from shot hole 62 to point $e$ to geophone 65 and from shot hole 63 to point $f$ to geophone 66 of Figure 15 are of the same length as the ray paths 61 to $a$ to 63 and 61 to $c$ to 64, respectively, of Figure 14. The travel paths 62 to $b$ to 63 and 62 to $d$ to 64 of Figure 14 would of course be the same in Figure 15, but are omitted there to clarify the illustration.

As previously stated, it is also within the contemplation of this invention to use a plurality of shot holes spaced in accordance with the incommensurable null principles set forth herein, as well as such spaced shot holes in conjunction with geophone arrays of the type herein described. In the latter instance the shot hole spacing will be such that each null of the shot hole spacing would be incommensurable with each null of the geophone pattern.

It will be apparent to persons skilled in the art that many modifications of this invention are possible without departing from its scope. It is therefore intended that the invention not be limited to the specific examples presented. The scope of the invention is defined by the following claims.

What is claimed is:

1. In the art of seismic prospecting an apparatus for detecting seismic signals which comprises at least two sets of seismic transducers, a plurality of seismic transducers in each set arranged in a line, adjacent transducers in each set being spaced by a selected distance, each set pointing in the same direction, the transducers in each set being spaced from the transducers in each other set by a distance incommensurable with said first selected distance, and means combining the outputs of said transducers.

2. An apparatus as defined in claim 1 in which the sets of transducers are arranged along a common line.

3. An apparatus as defined in claim 1 in which the sets are arranged in parallel lines.

4. An apparatus as defined in claim 1 in which the seismic transducers are geophones.

References Cited in the file of this patent

UNITED STATES PATENTS

| | | |
|---|---|---|
| 2,029,015 | Bohm | Jan. 28, 1936 |
| 2,180,949 | Blau et al. | Nov. 21, 1939 |
| 2,232,612 | Klipsch | Feb. 18, 1941 |
| 2,232,613 | Klipsch | Feb. 18, 1941 |
| 2,580,636 | Wolf | Jan. 1, 1952 |
| 2,586,731 | Simon et al. | Feb. 19, 1952 |
| 2,759,551 | Carlisle et al. | Aug. 21, 1956 |